(12) United States Patent
Harwath et al.

(10) Patent No.: US 9,270,048 B2
(45) Date of Patent: Feb. 23, 2016

(54) WEATHERIZED CONNECTOR BOOT AND CONNECTOR COVER THEREFORE

(71) Applicant: CommScope Technologies LLC, Hickory, NC (US)

(72) Inventors: Frank A. Harwath, Naperville, IL (US); Ronald A. Vaccaro, Shorewood, IL (US)

(73) Assignee: CommScope Technologies LLC, Hickory, NC (US)

( * ) Notice: Subject to any disclaimer, the term of this patent is extended or adjusted under 35 U.S.C. 154(b) by 0 days.

(21) Appl. No.: 14/748,181

(22) Filed: Jun. 23, 2015

(65) Prior Publication Data

US 2015/0380861 A1 Dec. 31, 2015

Related U.S. Application Data

(60) Provisional application No. 62/017,802, filed on Jun. 26, 2014.

(51) Int. Cl.

| | | |
|---|---|---|
| G02B 6/38 | (2006.01) | |
| G02B 6/44 | (2006.01) | |
| H01R 13/52 | (2006.01) | |
| H01R 13/533 | (2006.01) | |

(52) U.S. Cl.
CPC .............. *H01R 13/52* (2013.01); *G02B 6/3887* (2013.01); *G02B 6/3893* (2013.01); *H01R 13/533* (2013.01)

(58) Field of Classification Search
CPC .......................................................... G02B 6/20
USPC ................................................. 385/139–141
See application file for complete search history.

(56) References Cited

U.S. PATENT DOCUMENTS

| | | | | |
|---|---|---|---|---|
| 4,846,714 A | * | 7/1989 | Welsby | H01R 13/62 285/316 |
| 5,303,947 A | * | 4/1994 | Gerber | B62D 53/0828 280/423.1 |
| 5,480,315 A | * | 1/1996 | Martinelli | H01R 13/622 439/271 |
| 5,527,993 A | * | 6/1996 | Shotey | H02G 3/088 174/67 |
| 5,670,747 A | * | 9/1997 | Lawer | E21B 17/023 174/74 R |
| 6,374,561 B1 | * | 4/2002 | Ishiko | E04F 13/0814 52/366 |

(Continued)

FOREIGN PATENT DOCUMENTS

| | | |
|---|---|---|
| JP | 2000-021517 A | 1/2000 |
| KR | 10-2013-0111944 A | 10/2013 |

*Primary Examiner* — Akm Enayet Ullah
(74) *Attorney, Agent, or Firm* — Muncy, Geissler, Olds & Lowe, P.C.

(57) ABSTRACT

A weather resistant connector system includes a connector housing having a first open end, a second open end and a first interior space defined within. A boot has a first open end, a second open end and a second interior space defined within. The second open end of the boot is attached to the first open end of the connector housing. At least one engagement element is formed on the connector housing for engaging with a complimentary structure proximate a port. In one aspect, the boot is flexible and bi-stable, having a first at-rest shape and a second at-rest shape, with the first at-rest shape having the first open end of the connector housing located closer to the first open end of the boot, as compared to the second at-rest shape. In another aspect, the boot is flexible and has a first at-rest shape and the boot can be moved to a second, unstable shape, when a manual force is applied thereto. In a third aspect, a cable enters the first open end of the boot and the boot may be slid toward and away from the port along the cable.

21 Claims, 6 Drawing Sheets

(56) References Cited

U.S. PATENT DOCUMENTS

| | | | | |
|---|---|---|---|---|
| 6,582,248 B2* | 6/2003 | Bachman | H01R 13/516 | |
| | | | 429/447 | |
| 7,338,214 B1* | 3/2008 | Gurreri | G02B 6/3849 | |
| | | | 385/53 | |
| 8,556,520 B2* | 10/2013 | Elenbaas | G02B 6/3847 | |
| | | | 385/53 | |
| 8,672,705 B2 | 3/2014 | Schneider | | |
| 8,735,722 B2 | 5/2014 | Scholten et al. | | |
| 8,821,180 B2 | 9/2014 | Blakborn et al. | | |
| 8,853,537 B2* | 10/2014 | Kempeneers | G02B 6/4465 | |
| | | | 174/74 R | |
| 8,917,967 B2* | 12/2014 | Kempeneers | G02B 6/4471 | |
| | | | 385/139 | |
| 9,122,021 B2* | 9/2015 | Elenbaas | G02B 6/3847 | |
| 2003/0063867 A1* | 4/2003 | McDonald | G02B 6/3869 | |
| | | | 385/78 | |
| 2004/0245730 A1 | 12/2004 | Holland et al. | | |
| 2006/0035509 A1* | 2/2006 | O'Connor | H01R 13/5208 | |
| | | | 439/369 | |
| 2006/0154509 A1 | 7/2006 | Chen at al. | | |
| 2012/0108098 A1 | 5/2012 | Burris et al. | | |
| 2012/0285741 A1* | 11/2012 | Scholten | H02G 15/007 | |
| | | | 174/77 R | |
| 2013/0084747 A1 | 4/2013 | Dendas et al. | | |
| 2014/0037253 A1 | 2/2014 | Elenbaas et al. | | |
| 2014/0154914 A1 | 6/2014 | Schneider | | |
| 2014/0226937 A1 | 8/2014 | Elenbaas et al. | | |
| 2014/0308835 A1 | 10/2014 | Scholten et al. | | |

* cited by examiner

WEATHERIZED CONNECTOR BOOT AND CONNECTOR COVER THEREFORE This application claims the benefit of U.S. Provisional Application No. 62/017,802, filed Jun. 26, 2014, which is herein incorporated by reference.

BACKGROUND OF THE INVENTION

1. Field of the Invention

The present invention relates to environmentally, exposed connector ports and connectors therefore. More particularly, the present invention relates to a weatherized connector housing with a bi-stable connector boot attached thereto, allowing the connector housing to be displaced from the connector port for accessing a connector within.

2. Description of the Related Art

Electrical and optical interconnection junctions, such as the interconnection between a cable connector and a piece of electronic equipment, like a remote radio head (RRH), may be subject to degradation from environmental factors such as moisture, vibration and repeated expansion and contraction from daily temperature changes. Outer sealing enclosures that surround or enclose an electrical interconnection have been used to protect such interconnections. Enclosures often apply rigid clamshell configurations that, once closed, may be difficult to open, especially when installed in exposed or remote locations, such as atop radio towers at RRHs. Several prior art systems are known, such as those found in U.S. Pat. Nos. 8,556,520; 8,672,705; and 8,735,722, and US Published Applications 2013/0084747; 2014/0037253; and 2014/0154914, each of which is incorporated herein by reference.

Elastic interconnection seals are also known. Elastic seals can be advantageous by virtue of being more easily installed over the typically uneven contours of an electrical interconnection. Exemplary configurations are described in U.S. patent application Ser. No. 14/245,443, filed Apr. 4, 2014; 61/908,977, filed Nov. 26, 2013; Ser. No. 13/938,475, filed Jul. 10, 2013; and Ser. No. 13/646,952, filed Oct. 8, 2012, the disclosures of each of which are hereby incorporated by reference herein.

BRIEF DESCRIPTION OF THE DRAWINGS

The present invention will become more fully understood from the detailed description given hereinbelow and the accompanying drawings which are given by way of illustration only, and thus, are not limits of the present invention, and wherein.

DETAILED DESCRIPTION OF EMBODIMENTS OF THE INVENTION

Figure 1:
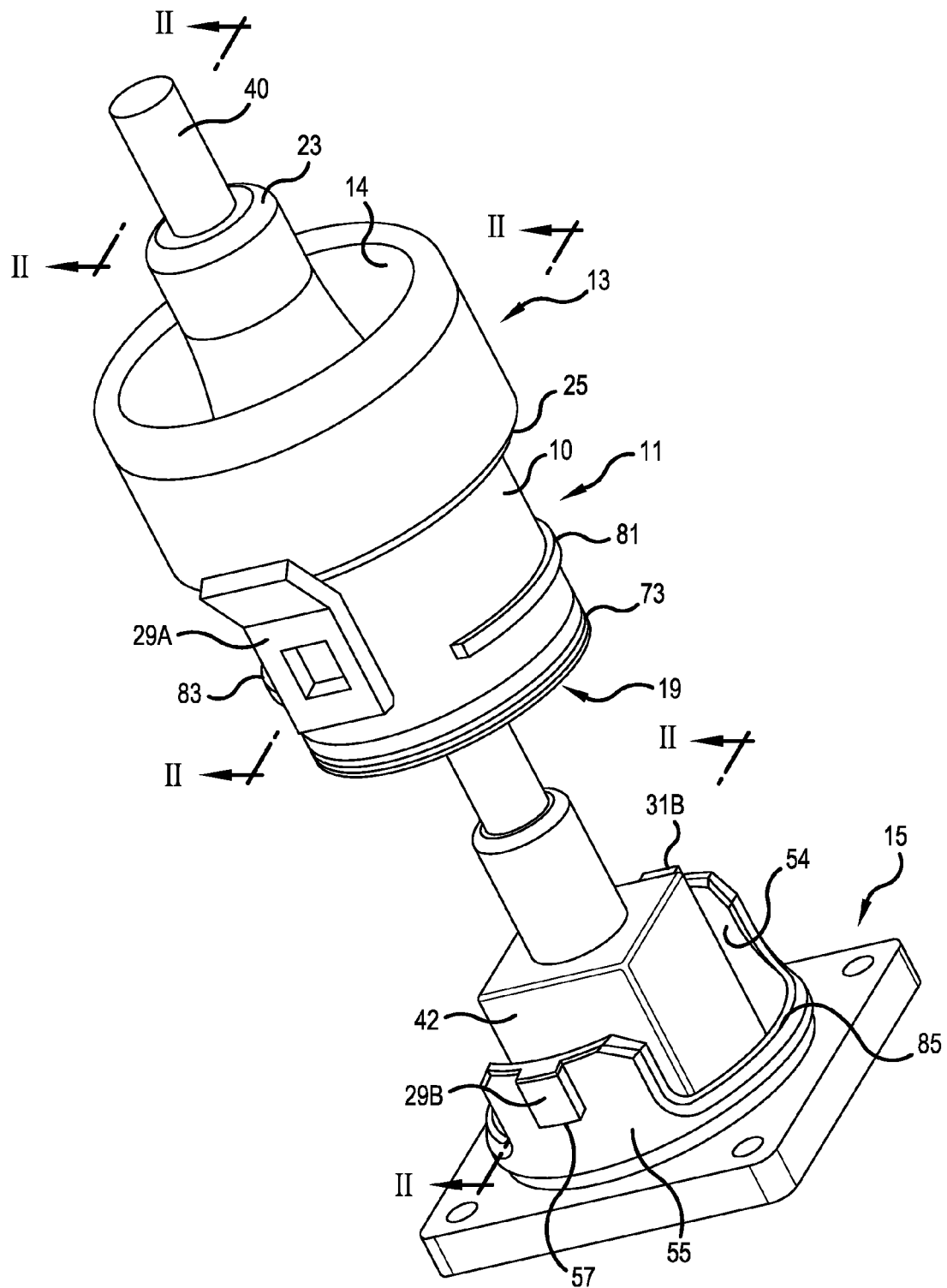
FIG. 1 is a perspective view of a connector housing and flexible boot in an open state, prior to engagement with a mating housing, in accordance with the present invention.

The present invention now is described more fully hereinafter with reference to the accompanying drawings, in which embodiments of the invention are shown. This invention may, however, be embodied in many different forms and should not be construed as limited to the embodiments set forth herein; rather, these embodiments are provided so that this disclosure will be thorough and complete, and will fully convey the scope of the invention to those skilled in the art.

Like numbers refer to like elements throughout. In the figures, the thickness of certain lines, layers, components, elements or features may be exaggerated for clarity. Broken lines illustrate optional features or operations unless specified otherwise.

The terminology used herein is for the purpose of describing particular embodiments only and is not intended to be limiting of the invention. Unless otherwise defined, all terms (including technical and scientific terms) used herein have the same meaning as commonly understood by one of ordinary skill in the art to which this invention belongs. It will be further understood that terms, such as those defined in commonly used dictionaries, should be interpreted as having a meaning that is consistent with their meaning in the context of the specification and relevant art and should not be interpreted in an idealized or overly formal sense unless expressly so defined herein. Well-known functions or constructions may not be described in detail for brevity and/or clarity.

As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. As used herein, the term "and/or" includes any and all combinations of one or more of the associated listed items. As used herein, phrases such as "between X and Y" and "between about X and Y" should be interpreted to include X and Y. As used herein, phrases such as "between about X and Y" mean "between about X and about Y." As used herein, phrases such as "from about X to Y" mean "from about X to about Y."

It will be understood that when an element is referred to as being "on", "attached" to, "connected" to, "coupled" with, "contacting", etc., another element, it can be directly on, attached to, connected to, coupled with or contacting the other element or intervening elements may also be present. In contrast, when an element is referred to as being, for example, "directly on", "directly attached" to, "directly connected" to, "directly coupled" with or "directly contacting" another element, there are no intervening elements present. It will also be appreciated by those of skill in the art that references to a structure or feature that is disposed "adjacent" another feature may have portions that overlap or underlie the adjacent feature.

Spatially relative terms, such as "under", "below", "lower", "over", "upper", "lateral", "left", "right" and the like, may be used herein for ease of description to describe one element or feature's relationship to another element(s) or feature(s) as illustrated in the figures. It will be understood that the spatially relative terms are intended to encompass different orientations of the device in use or operation in addition to the orientation depicted in the figures. For example, if the device in the figures is inverted, elements described as "under" or "beneath" other elements or features would then be oriented "over" the other elements or features. The device may be otherwise oriented (rotated 90 degrees or at other orientations) and the descriptors of relative spatial relationships used herein interpreted accordingly.

Figure 2:
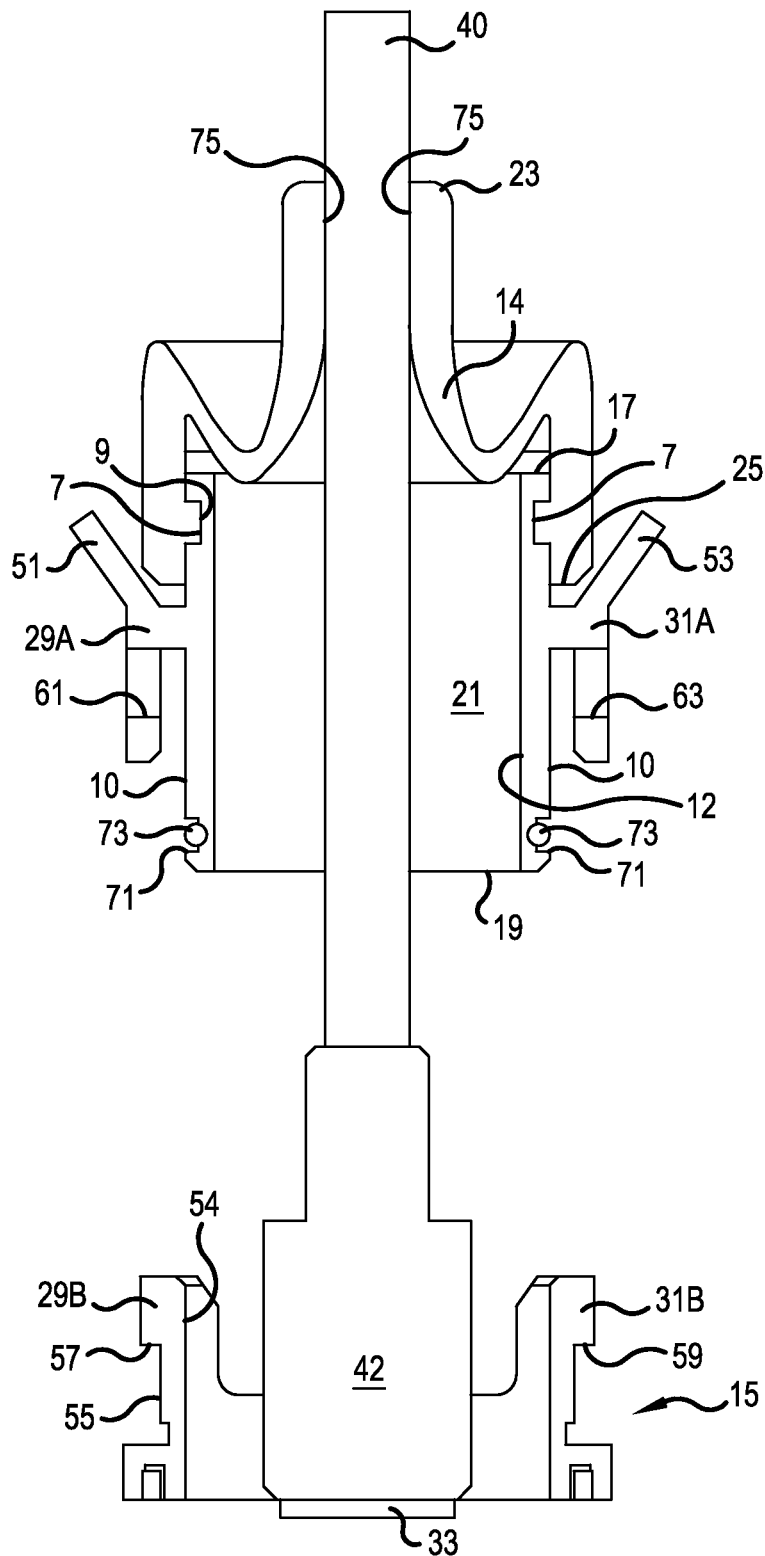
FIG. 2 is a cross sectional view taken along lines II-II in FIG. 1.
Figure 3:
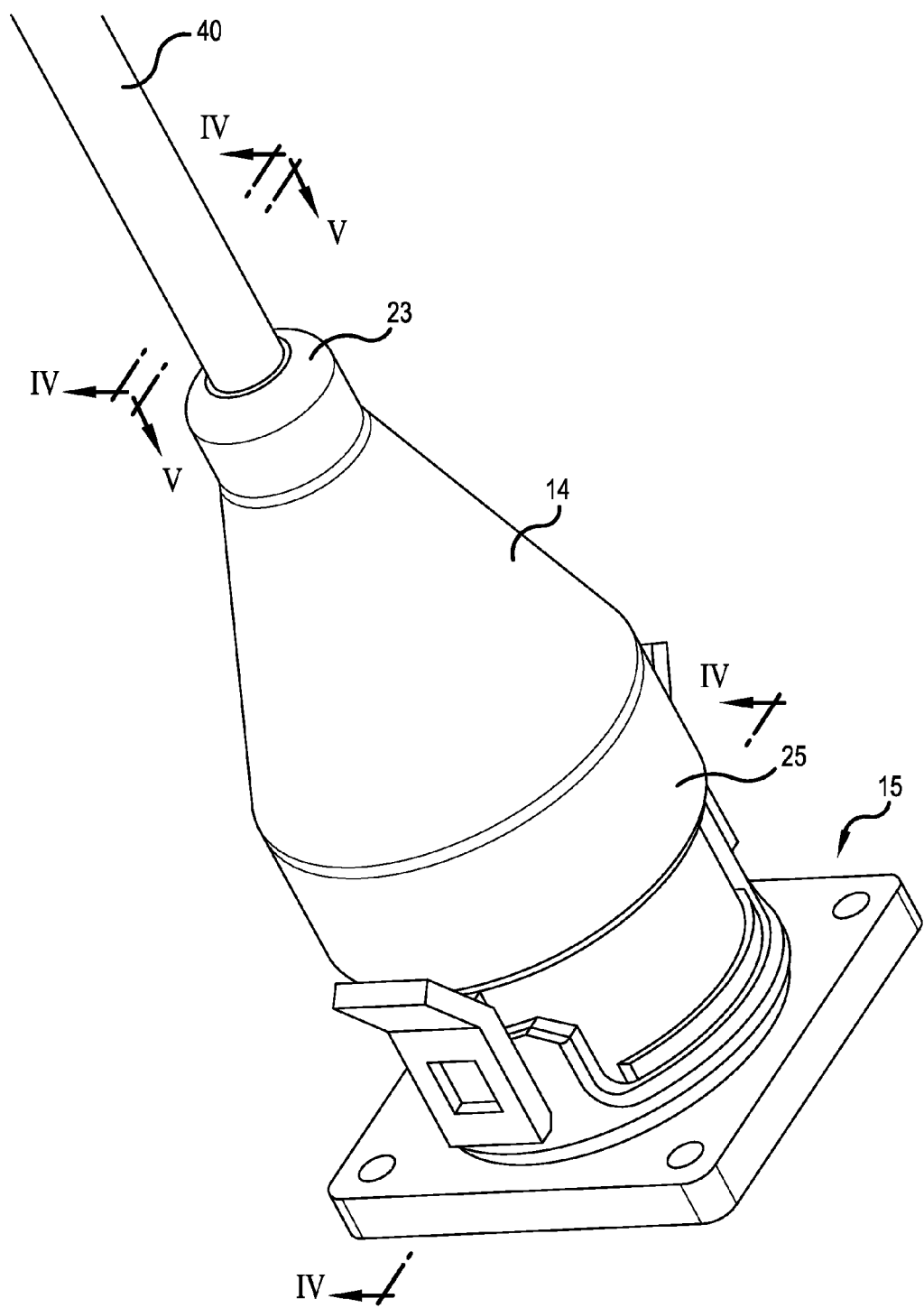
FIG. 3 is a perspective view of the connector housing and flexible boot in a closed state, engaged with the mating housing, in accordance with the present invention.
Figure 4:
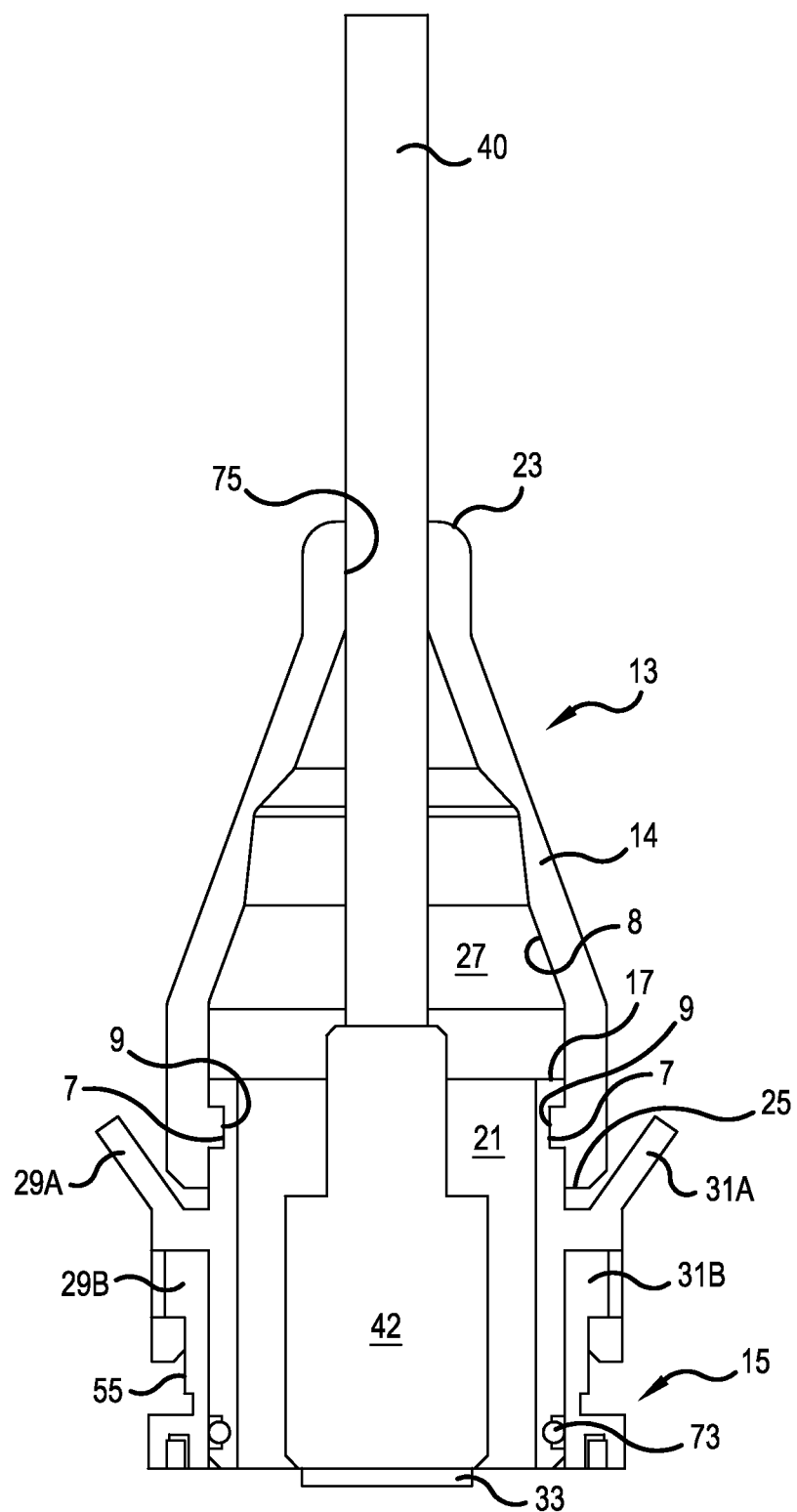
FIG. 4 is a cross sectional view taken along lines IV-IV in FIG. 3.

FIG. 1 shows a weather resistant connection system. The weather resistant connection system includes a connector housing 11 and a flexible boot 13. FIGS. 1 and 2 illustrate the connector housing 11 and the flexible boot 13 in an open state, prior to engagement with a mating housing 15. FIGS. 3 and 4 illustrate the connector housing 11 and the flexible boot 13 in a closed state, engaged with a mating housing 15.

The connector housing 11 has a first open end 17 and a second open end 19, opposite the first open end 17. A first interior space 21 is defined within the connector housing 11. In one embodiment, the connector housing 11 is substantially cylindrical in shape, including an outer cylindrical surface 10 and an inner cylindrical surface 12.

The flexible boot 13 has a first open end 23 and a second open end 25, opposite the first open end 23. A second interior space 27 is defined within the flexible boot 13. The second open end 25 of the flexible boot 13 is attached to the first open 17 end of the connector housing 11, such that the first interior space 21 communicates to the second interior space 27. In one embodiment, the flexible boot 13 is approximately funnel shaped with the first open end 23 of the flexible boot 13 being smaller in size as compared to the second open end 25 of the flexible boot 13. A conical portion 14 connects the first open end 23 of the flexible boot 13 to the second open end 25 of the flexible boot 13.

The flexible boot includes an inner surface 8 (FIG. 4) facing to the second interior space 27. An inwardly protruding ridge 9 may be formed around the inner surface 8 of the flexible boot 13, proximate the second end 25. The outer surface 10 of the connector housing 11 includes a recessed ring 7 proximate the first end 17 of the connector housing 11. The inwardly protruding ridge 9 seats into the recessed ring 7 to attach the second open end 25 of the flexible boot 13 to the first open end 17 of the connector housing 11. Of course, other methods of attachment may supplement or substitute for the illustrated attachment method, such as adhesives.

The flexible boot 13 is bi-stable having a first at-rest shape (FIGS. 1 and 2), wherein the flexible boot 13 tends to maintain its first at-rest shape, when in its first at-rest state, until an external force, such as a manual pulling or pushing force applied by fingers, is applied to the flexible boot 13. The flexible boot 13 also has a second at-rest shape (FIGS. 3 and 4), wherein the flexible boot 13 tends to maintain its second at-rest shape, when in its second at-rest state, until an external force, e.g., finger manipulation, is applied to the flexible boot 13. In the first at-rest shape (FIGS. 1 and 2), the first open end 17 of the connector housing 11 is located closer to the first open end 23 of the flexible boot 13 as compared to the second at-rest shape (FIGS. 3 and 4). The flexible boot 13 may be formed of rubber, silicone, EPDM or materials with similar functionality to enable the bi-stable positions, e.g., elastic materials, silicone rubber thermoplastic elastomeric material, molded closed-cell foam material.

The bi-stable nature of the flexible boot 13 is analogous to a toilet bowl plunger head. The plunger head has a first stable state in which a cross sectional shape of the plunger head is somewhat U-shaped or V-shaped. If a person pushed the plunger stick into the toilet too far, the plunger head inverts to a somewhat W-shaped cross section, and remains stably in the inverted shape until a manual force is applied to pop the plunger head back to its initial shape. The flexible boot 13 has a similar U-shape or V-shape cross section in the stable, second at-rest shape, and a similar W-shaped cross section in the stable, first at-rest shape. The flexible boot 13 may include ridges, valleys or corrugations on its outer or inner surfaces, or within the walls of the flexible boot 13, to assist in creating and maintaining the first and second at-rest shapes.

A cable 40 enters the first open end 23 of the flexible boot 13 and passes through the second interior space 27. The cable 40 enters the first open end 17 of the connector housing 11 and passes into the first interior space 21. An optical or electrical connector 42 is terminated to an end of the cable 40. The optical or electrical connector 42 may be any known type, such as LC, ST SC, RJ, MPO, a combination of same or different connectors, a hybrid connector with both electrical and optical features, or a custom connector.

When the flexible boot 13 is in the first at-rest shape (FIGS. 1 and 2), the connector 42 pass through the second open end 19 of the connector housing 11. When the flexible boot 13 is in the second at-rest shape (FIGS. 3 and 4), the connector 42 may at least partially remaining inside the first interior space 21 of the connector housing 11, or at the least does not extend as far outside of the first interior space 21.

The connector 42 is designed to mate with a port 33. The port is proximate, e.g., surrounded by the mating housing 15. In the embodiments of FIGS. 1-4, the mating housing 15 is substantially cylindrical in shape, including an outer cylindrical surface 55 and an inner cylindrical surface 54. In general, the mating housing 15 may be constructed the same as shown in FIG. 3 of U.S. Pat. No. 8,556,520. However, the mating housing 15 may alternatively be constructed in different configurations, as will be described in connection with FIG. 6.

The connector housing 11 includes at least one engagement element 29A for engaging with a complimentary structure 29B of the mating housing 15 to secure the connector housing 11 to the mating housing 15. The complimentary structure 29B of the mating housing 15 is dimensioned to interact with the at least one engagement element 29A. In one embodiment, the at least one engagement element 29A includes first and second latches 29A and 31A extending away from the outer surface 10 of the connector housing 11. The first and second latches 29A and 31A are resilient and can move relative to the outer surface 10 of the connector housing 11 from a latch-engaging position to a latch-disengaging position. For example, pressing in the curved tabs 51 and 53 causes the first and second latches 29A and 31A to move outward to disengaging positions.

The at least one mating engagement element 29B on the mating housing 15 preferably includes a recess or protrusion formed on the outer surface 55 of the mating housing 15. In FIGS. 1-4, the engagement elements are ledges 57 and 59 on protrusions. The ledges 57 and 59 interact with ledges 61 and 63 (FIG. 2) on the first and second latches 29A and 31A to secure the connector housing 11 to the mating housing 15.

In one embodiment, the first and second latches 29A and 31A are located one hundred eighty degrees apart on the outer surface 10 of the connector housing 11. Likewise, the ledges 57 and 59 on the protrusions of the mating housing 15 are formed on the outer surface 55 of the mating housing 15 about one hundred eighty degrees apart. Of course, other configurations are possible and within the scope of the present invention.

In operation, a person manually moves the flexible boot 13 to its first at-rest shape (FIGS. 1 and 2). Next, the connector 42 is mated to the port 33. The person, then begins to manually move the flexible boot 13 to its second at-rest shape (FIGS. 3 and 4). As the flexible boot 13 is moved, the outer cylindrical surface 10 of the connector housing 11 is guided into engagement with the inner surface 54 of the mating housing 15. The outer cylindrical surface 10 of the connector housing 11 is dimensioned to closely slide on the inner cylindrical surface 54 of the mating housing 15.

Optionally, the connector housing 11 may include an annular groove 71 (FIG. 2) formed proximate the second open end 19 on the outer cylindrical surface 10. An o-ring 73 may be seated within the groove 71 to seal the outer cylindrical surface 10 of the connector housing 11 to the inner cylindrical surface 54 of the mating housing 15.

The first and second latches 29A and 31A may then be engaged to the ledges 57 and 59 on the outer surface 55 of the mating housing 15. Should the latches 29A and 31A not be properly aligned, it may be possible to rotate the connector cover (flexible boot 13 and connector housing 11 combination) relative to the cable 40.

Figure 5:
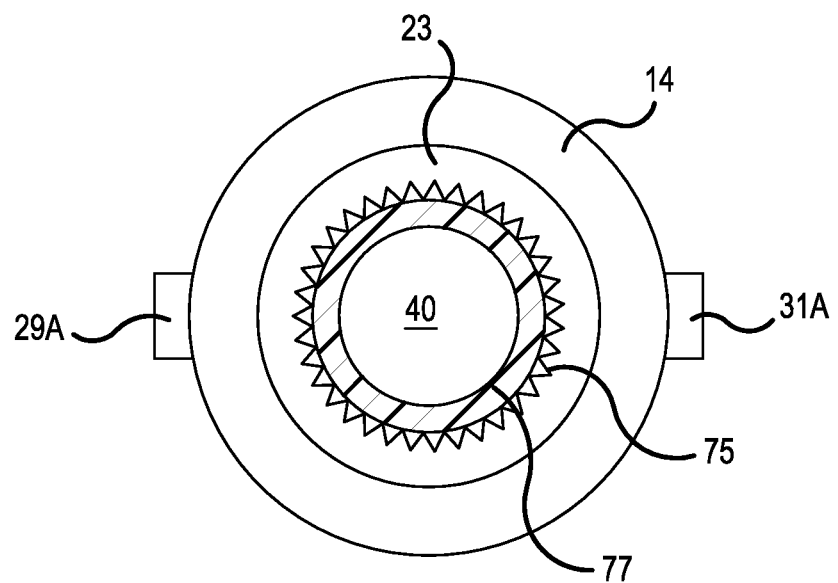
FIG. 5 is a cross sectional view taken along line V-V in FIG. 3.

As shown in the cross sectional view of FIG. 5, the first open end 23 of the flexible boot, as serrations 75 formed on the inner surface 8 of the flexible boot 13, proximate to the first open end 23. The serrations 75 engage a jacket 77 of the cable 40 to create frictional engagement. The frictional coefficient existing between the serrations 75 and the jacket 77 may be overcame by manual force, so that the flexible boot 13, and the connector housing 11 attached thereto, may be rotated about the jacket 77 of the cable 40.

In one embodiment, the serrations 75 are a series of peaks and valleys extending around the entire inner surface 8 of the flexible boot 13 near the first open end 23. The peaks and valleys extend in a direction from the first open end 23 of the flexible boot 13 toward the second open end 25 of the flexible boot 13, but need only exist in the portion of the inner surface 8 in contact with the jacket 77 of the cable 40.

Figure 6:
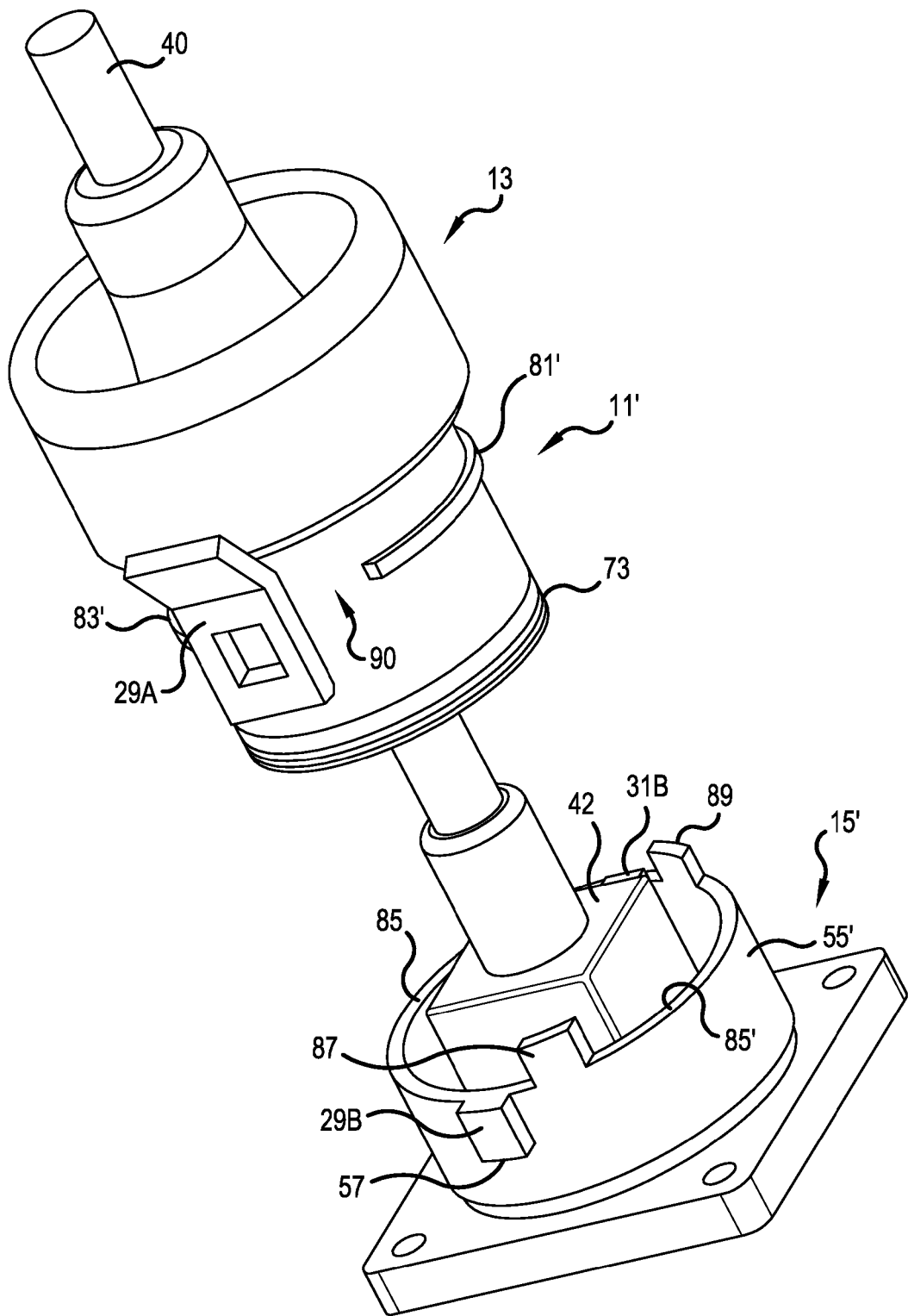
FIG. 6 is perspective view, similar to FIG. 1, but showing an alternative embodiment of the connector housing and mating housing.

FIG. 6 is perspective view, similar to FIG. 1, but illustrates an alternative embodiment of the connector housing 11' and the mating housing 15'. In FIGS. 1-4, the mating housing 15 had first and second protrusions supporting the first and second ledges 57 and 59. Two recessed areas existed between the protrusions and accepted first and second guide tracks 81 and 83 formed on the outer surface 10 of the connector housing 11. The first and second guide tracks 81 and 83 assisted in aligning the first and second latches 29A and 31A to the mating housing 15 and also controlled a depth of insertion of the connector housing 11 into the mating housing 15 by having the first and second guide tracks 81 and 83 abut a top wall 85 of the mating housing 15.

FIG. 6 illustrates that the ledges 57 and 59 need not be located on protrusions of the mating enclosure. The outer wall 55' of the mating housing 15' can be entirely cylindrical. Alternatively, as illustrated in FIG. 6, protrusions 87 and 89 may extend upwardly from the top wall 85 of the mating housing 15' in locations remote from the ledges 57 and 59. The protrusions 87 and 89 may extend into gaps 90 formed between the modified first guide track 81' and the first and second latches 29A and 31A to assisted in aligning the first and second latches 29A and 31A to the mating housing 15. The modified first and second guide tracks 81' and 83' are elevated and still serve to control a depth of insertion of the connector housing 11' into the mating housing 15' by abutting the top wall 85' of the mating housing 15'.

An alternative embodiment of the invention would have a flexible, but mono-stable, boot assembly 13A. In this embodiment, the flexible boot 13A would be stable in only one of the first shape (FIGS. 1-2) or the second shape (FIGS. 3-4). This embodiment is slightly less preferably as compared to the embodiment described in connection with FIGS. 1-4, above, because the technician would need to overcome the natural resiliency of the flexible boot 13A to obtain one of the first or second shapes.

For instance, if the flexible boot 13A were naturally at-rest in the second shape of FIGS. 3-4, the technician would need to hold the flexible boot 13A in the first shape in order to couple or uncouple the connector 42 to/from the port 33. This would require one hand to hold the flexible boot 13A, while the other hand manipulates the connector 42. If the flexible boot 13A were naturally at-rest in the first shape of FIGS. 1-2, the technician would need to overcome the resiliency of the flexible boot 13A, while also attempting to engage latches 29A and 31A to ledges 57 and 59 of the mating housing 15. If the flexible boot 13A were naturally at-rest at some intermediate shape between the first shape of FIGS. 1-2 and the second shape of FIGS. 3-4, the technician would need to control the flexible boot position manually during both operations, e.g., manipulating the connector 42, and engaging the latches 29A and 31A.

Another alternative embodiment of the invention would have a less flexible and mono-stable boot assembly 13B. In this embodiment, the boot 13B would be stable in only the second shape of FIGS. 3-4, and might not have the flexibility to assume the first shape of FIGS. 1-2.

To seat and unseat the connector housing 11 to the mating housing 15, the first open end 23 of the boot 13B slides over the cable 40. To this end the serrations 75 of FIG. 5 may assist in reducing the friction between the first open end 23 and the jacket 77 of the cable 40. The serrations 75 may also be reoriented to extend perpendicular to direction illustrated, i.e., to form plural annual rings. The annual rings would create multiple moisture barriers. The boot 13B and connector housing 11, as a combination, would be slid away from the mating housing 15 to gain access to the port 33. The first open end 23 of the boot 13B would be slid along the cable 40 to move the boot 13B and connector housing 11, as a combination, until the connector housing 11 seats into the mating housing 15, when it is desired to engage the latches 29A and 31A to the ledges 57 and 59 of the mating housing 15.

In the above various embodiments, the first open end 23 of the boot 13, 13A, 13B has been described/illustrated as being in direct contact with the jacket 77 of the cable 40. It would be possible to include a secondary element between the cable jacket 77 and the first open end 23 of the boot 13, 13A 13B. For example, the cable 40 could have a wrap, sleeve or cylindrical housing attached to the jacket 77 in the area proximate interaction with the first open end 23 of the boot 13, 13A, 13B. The secondary element can be designed to have a good connection to the jacket 77 of the cable 40, while providing an outer surface designed to interact in the proper manner with the first open end 23 of the boot 13, 13A, 13B, wherein the proper manner may be a fixed attachment, annual rotation, or axial sliding, depending upon the embodiment being practiced.

The invention being thus described, it will be obvious that the same may be varied in many ways. Such variations are not to be regarded as a departure from the spirit and scope of the invention, and all such modifications as would be obvious to one skilled in the art are to be included within the scope of the following claims.

The invention claimed is:
1. A weather resistant connector system comprising:
   a connector housing having a first open end and a second open end, opposite said first open end, and a first interior space defined within said connector housing;
   a flexible boot having a first open end and a second open end, opposite said first open end, and a second interior space defined within said flexible boot, wherein said second open end of said flexible boot is attached to said first open end of said connector housing, such that said first interior space communicates to said second interior space;

at least one engagement element formed on said connector housing for engaging with a complimentary structure proximate a port, wherein said flexible boot is bi-stable having a first at-rest shape and a second at-rest shape, wherein said flexible boot tends to maintain its first at-rest shape when in its first at-rest shape, until an external force is applied to said flexible boot, and wherein said flexible boot tends to maintain its second at-rest shape when in its second at-rest shape, until an external force is applied to said flexible boot; and wherein said first at-rest shape has said first open end of said connector housing located closer to said first open end of said flexible boot as compared to said second at-rest shape.

2. The connector system according to claim 1, wherein said flexible boot is approximately funnel shaped with said first open end of said flexible boot being smaller in size as compared to said second open end of said flexible boot, and a conical portion connecting said first open end of said flexible boot to said second open end of said flexible boot.

3. The connector system according to claim 1, wherein said flexible boot includes an inner surface facing to said second interior space, and further comprising:
an inwardly protruding ridge formed around said inner surface of said flexible boot proximate said second end of said flexible boot.

4. The connector system according to claim 3, wherein said connector housing includes an outer surface, and further comprising:
a recessed ring formed in said outer surface of said connector housing proximate said first end of said connector housing, wherein said inwardly protruding ridge seats into said recessed ring to attach said second open end of said flexible boot to said first open end of said connector housing.

5. The connector system according to claim 1, wherein said first open end of said flexible boot includes serrations formed on an inner surface thereof for engaging a cable jacket.

6. The connector system according to claim 5, wherein said serrations are a series of peaks and valleys extending around the entire inner surface of said first open end of said flexible boot, and wherein said peaks and valleys extend in a direction from said first end of said flexible boot toward said second end of said flexible boot.

7. The connector system according to claim 1, wherein said connector housing is substantially cylindrical in shape, including an outer cylindrical surface and an inner cylindrical surface.

8. The connector system according to claim 7, wherein said connector housing includes a groove formed proximate said second open end on said outer cylindrical surface, and further comprising:
an o-ring seal seated within said groove.

9. The connector system according to claim 1, wherein said at least one engagement element formed on said connector housing includes at least one latch extending away from an outer surface of said connector housing, wherein said at least one latch is resilient and can move relative to said outer surface of said connector housing from a latch-engaging position to a latch-disengaging position.

10. The connector system according to claim 9, wherein said at least one latch includes first and second latches located one hundred eighty degrees apart on said outer surface of said connector housing.

11. The connector system according to claim 1, further comprising:
a cable entering said first open end of said flexible boot, passing through said second interior space, entering said first open end of said connector housing and passing into said first interior space; and
an optical and/or electrical connector terminating an end of said cable.

12. The connector system according to claim 11, wherein said first open end of said flexible boot includes serrations formed on an inner surface thereof, and wherein said serrations engage a jacket of said cable, and wherein a frictional coefficient existing between said serrations and said jacket of said cable may be overcame by manual force, so that said flexible boot may rotate about said jacket of said cable.

13. The connector system according to claim 11, further comprising:
a port; and
a mating housing proximate said port, said mating housing including at least one mating engagement element dimensioned to interact with said at least one engagement element of said connector housing to secure said connector housing to said mating housing.

14. The connector system according to claim 13, wherein said connector housing is substantially cylindrical in shape, including an outer cylindrical surface and an inner cylindrical surface, and wherein said mating housing is substantially cylindrical in shape, including an outer cylindrical surface and an inner cylindrical surface surrounding said port, and wherein said outer cylindrical surface of said connector housing is dimensioned to closely slide into said inner cylindrical surface of said mating housing, and wherein said connector housing includes a groove formed in said outer cylindrical surface, proximate said second open end, and further comprising:
an o-ring seal seated within said groove, wherein said or-ring seals said outer cylindrical surface of said connector housing to said inner cylindrical surface of said mating housing.

15. The connector system according to claim 13, wherein said at least one engagement element formed on said connector housing includes at least one latch extending away from an outer surface of said connector housing, wherein said at least one latch is resilient and can move relative to said outer surface of said connector housing from a latch-engaging position to a latch-disengaging position, and wherein said at least one mating engagement element on said mating housing includes a recess or protrusion formed on an outer surface of said mating housing to interact with said at least one latch of said connector housing to secure said connector housing to said mating housing.

16. The connector system according to claim 15, wherein said at least one latch includes first and second latches located one hundred eighty degrees apart on said outer surface of said connector housing, and wherein said at least one mating engagement element on said mating housing includes first and second recesses or protrusions formed on an outer surface of said mating housing located one hundred eighty degrees apart on said outer surface of said mating housing.

17. A weather resistant connector system comprising:
a connector housing having a first open end and a second open end, opposite said first open end, and a first interior space defined within said connector housing;
a flexible boot having a first open end and a second open end, opposite said first open end, and a second interior space defined within said flexible boot, wherein said second open end of said flexible boot is attached to said first open end of said connector housing, such that a first interior space communicates to said second interior space; and at least one engagement element formed on said connector housing for engaging with a complimentary structure proximate a port, wherein said flexible boot has a first at-rest shape, wherein said flexible boot tends to maintain its first at-rest shape when in its first at-rest shape, until an external force is applied to said flexible boot, and wherein said flexible boot can be moved to a second shape when a manual force is applied thereto;

a cable entering said first open end of said flexible boot, passing through said second interior space, entering said first open end of said connector housing and passing into said first interior space;

an optical and/or electrical connector terminating an end of said cable;

a port; and a mating housing proximate said port, said mating housing including at least one mating engagement element dimensioned to interact with said at least one engagement element of said connector housing to secure said connector housing to said mating housing, wherein said connector housing is positioned to mate to said mating housing when said flexible boot is in at least one of said first at-rest shape or said second shape, and wherein said connector housing is remote from said mating housing to provide access to said connector and said port when said flexible boot is in the opposite of said at least one of said first at-rest shape or said second shape.

18. The connector system according to claim 17, wherein said first at-rest shape of said flexible boot has said first open end of said connector housing located closer to said first open end of said flexible boot as compared to said second shape of said flexible boot, such that said connector and said port may be accessed.

19. The connector system according to claim 17, wherein said first at-rest shape of said flexible boot places said connector housing in a position to mate to said mating housing.

20. A weather resistant connector system comprising:
a connector housing having a first open end and a second open end, opposite said first open end, and a first interior space defined within said connector housing;
a boot having a first open end and a second open end, opposite said first open end, and a second interior space defined within said boot, wherein said second open end of said boot is attached to said first open end of said connector housing, such that a first interior space communicates to said second interior space; and
at least one engagement element formed on said connector housing for engaging with a complimentary structure proximate a port,
a cable entering said first open end of said boot, passing through said second interior space, entering said first open end of said connector housing and passing into said first interior space;
an optical and/or electrical connector terminating an end of said cable, wherein said first open end of said boot may slide relative to said cable from a first position wherein said first open end is further from said connector to a second position wherein said first open end is closer to said connector;
a port; and
a mating housing proximate said port, said mating housing including at least one mating engagement element dimensioned to interact with said at least one engagement element of said connector housing to secure said connector housing to said mating housing, wherein said connector housing is positioned to mate to said mating housing when said boot is slid toward said port and said first open end of said boot is in said second position relative to said cable, and wherein said connector housing is remote from said mating housing to provide access to said connector and said port when said boot is slid rearwardly away from said port and said first open end of said boot is in said second position relative to said cable.

21. The connector system according to claim 20, wherein said boot either slides directly on said cable, or wherein said boot slides on a secondary element, which is in turn attached to said cable.

* * * * *